United States Patent [19]

Zeller

[11] Patent Number: 4,714,430

[45] Date of Patent: Dec. 22, 1987

[54] ELECTRIC CONTACT DEVICE FOR PROTECTIVE GAS BAG IMPACT INSTALLATIONS IN AUTOMOTIVE VEHICLES

[75] Inventor: Gregor Zeller, Aschaffenburg, Fed. Rep. of Germany

[73] Assignee: Petri A.G., Fed. Rep. of Germany

[21] Appl. No.: 842,948

[22] Filed: Mar. 24, 1986

[30] Foreign Application Priority Data

Mar. 23, 1985 [EP] European Pat. Off. ........ 85103482.7

[51] Int. Cl.$^4$ ............................................. H01R 39/00
[52] U.S. Cl. ..................................... 439/15; 200/61.55
[58] Field of Search ............... 200/61.27, 61.31, 61.35, 200/61.54, 11 J, 303; 339/1 R, 2, 3 R, 3 S, 5 R, 5 M, 5 P, 6 R, 8 R, 8 PB

[56] References Cited

U.S. PATENT DOCUMENTS

| | | | |
|---|---|---|---|
| 3,763,455 | 10/1973 | Confer et al. | 339/3 S |
| 4,380,341 | 4/1983 | Waldschutz et al. | 200/61.55 |
| 4,422,699 | 12/1983 | Sakurai | 339/3 S |
| 4,451,105 | 5/1984 | Sakurai | 339/113 R |
| 4,548,454 | 10/1985 | Zeller et al. | 339/6 R X |
| 4,571,469 | 2/1986 | Hanaki | 200/61.54 |

FOREIGN PATENT DOCUMENTS

901376 1/1954 Fed. Rep. of Germany ... 200/61.54
3009109 2/1986 Fed. Rep. of Germany .

Primary Examiner—J. R. Scott
Attorney, Agent, or Firm—Robert J. Koch

[57] ABSTRACT

Electric contact device for protective gas bag impact installations in automotive vehicles having a contact located on the hub or the steering spindle, respectively, which rotates with the steering wheel hub. A counter contact path is fixedly mounted concentrically surrounding the steering wheel. The contact is held by the force of springs in constant sliding contact against the counter contact path. The counter contact path is located in the bottom trough of an annular housing and the contact guide is in the form of a contact ring in the annular groove of a cover which overlaps the bottom trough. The contact ring is held against the counter contact path by a plurality of springs placed between the contact ring and the bottom of the groove. The bottom trough and the cover are guided in each other by annular lands which engage the annular groove with a certain clearance. The cover is clamped to the bottom trough by several clip noses arranged on the edge of the cover and overlapping the bottom trough. The dimensions of the assembly are such that the cover and the bottom trough are slightly compressed during the mounting of the steering wheel hub screwed onto the steering spindle against the force of the springs loading the contact ring, while releasing the clip noses.

14 Claims, 4 Drawing Figures

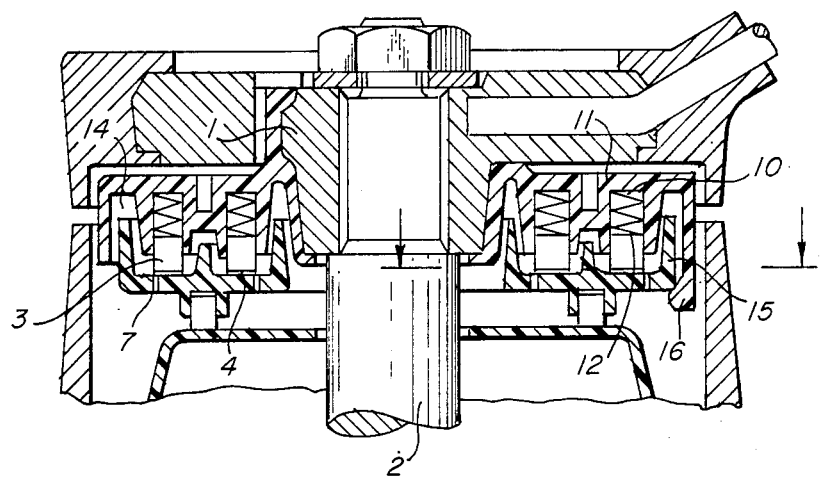
FIG. 1
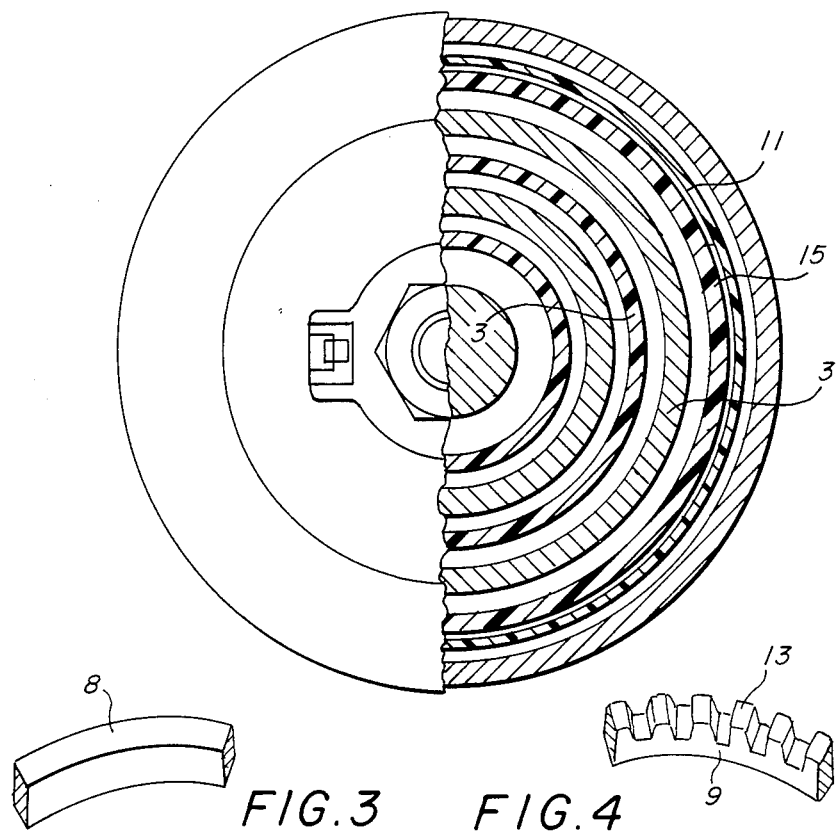
FIG. 2
FIG. 3   FIG. 4

ELECTRIC CONTACT DEVICE FOR PROTECTIVE GAS BAG IMPACT INSTALLATIONS IN AUTOMOTIVE VEHICLES

CROSS REFERENCES TO RELATED APPLICATIONS

This application is related to U.S. patent application Ser. No. 835,282, filed Mar. 3, 1986, now U.S. Pat. No. 4,657,326; co-pending U.S. patent application Ser. Nos. 842,947 and 842,949, filed Mar. 24, 1986 and U.S. patent application Ser. No. 842,833, filed Mar. 24, 1986, now U.S. Pat. No. 4,660,500. The disclosures of all the above documents are expressly incorporated by reference herein.

BACKGROUND OF THE INVENTION

1. Field of the Invention

The invention relates to an electric contact device for protective gas bag installations in automotive vehicles. The device has a contact located on the hub or steering spindle which rotates with the hub of the steering wheel and a fixedly mounted counter contact path concentrically surrounding the steering spindle where the contact is held by the force of a spring in a constant sliding contact on the counter contact path.

2. Description of the Related Art

In known sliding contacts, the contact located on the rotating part such as the steering spindle or the hub of the steering wheel, consists of a slip ring. The portion mounted on the stationary part such as on a contact housing is one or more contact springs or brushes formed by a bundle of metal wires. These spring contacts have the significant disadvantage that in the case of extreme decelerations, for example in an accident, they can lift off the counter contact path, thereby interrupting the current, so that the protective gas bag impact device is inactive at the decisive moment. Additionally, brush contacts tend to wear excessively, invoking the risk of malfunctions because of the variation of the contact pressure.

SUMMARY OF THE INVENTION

It is an object of the invention to provide an electric contact device for protective gas bag impact installations in automotive vehicles which permanently assures secure transmission of the current from a fixedly mounted contact to a counter contact path rotating with the steering wheel. According to the invention the counter contact path is arranged in the bottom trough of an annular housing and the contact is guided in the form of a contact ring in a annular groove of a cover overlapping the said trough. The contact ring is held against the counter contact path by a plurality of springs located between the contact ring and the bottom of the groove.

The electric contact device for protective gas bag impact installations in automotive vehicles, permanently assures secure transmission from the fixedly mounted contact to the counter contact path rotating with the steering wheel. Both the contact and the counter contact are formed by ring elements which rub against each other and are held in an at least point-shaped contact independently of their position and loading.

The contact ring may be in the form of an annulus with simple, flat and smooth contact surfaces, but advantageously it is in the shape of a comb-type ring with spherically rounded comb tips, thereby a larger number of contact points are present and thus a higher degree of security in relation to current conduction results. The contact ring may comprise metal or a metal graphite which advantageously possesses a higher resistance to abrasion and improved conductivity. The current connector may comprise several concentric contact and counter contact paths in the annular housing whereby the operational safety of the protective gas bag impact installation may be further increased.

In a particularly advantageous embodiment, the bottom and the cover are guided in each other by annular lands or guides engaging annular grooves with some clearance. The cover is clamped to the bottom trough by several clip noses which grip the bottom trough. The assembly is dimensioned so that the cover and the bottom trough are compressed slightly during assembly by the steering wheel hub screwed onto the steering spindle against the force of the springs loading the contact ring while releasing the clip noses. In this manner, it is possible to produce the current conductor as a preassembled unit, thereby assuing its simple and ready installation in the steering wheel.

BRIEF DESCRIPTION OF THE DRAWINGS

The invention is made apparent by an example of embodiment with references to the drawing. In the drawing:

FIG. 1 shows a section through a current connector according to the invention.

FIG. 2 shows a partial sectional view from above of FIG. 1.

FIG. 3 shows a partial perspective view of a contact ring.

FIG. 4 shows a partial perspective view of a further embodiment of a contact ring.

DETAILED DESCRIPTION OF THE PREFERRED EMBODIMENT

The electric contact device for protective gas bag impact installations for automotive vehicles shown in the drawing includes a contact 3 located on the hub 1 or the steering spindle 2, respectively, and rotating with the steering wheel hub, and a fixedly mounted counter contact path 4 concentrically surrounding the steering spindle. The contact 3 is held by the force of springs in constant sliding contact on the counter contact path 4. The counter contact path 4 is arranged in the bottom trough 7 of an annular housing. The contact or contact ring 3 is guided in an annular groove 10 of a cover 11 which overlaps the bottom trough 7. The contact ring 3 is held by a plurality of springs 12 located between the contact ring 3 and the bottom of the groove against the counter contact path 4. The contact ring may be a flat and smooth annulus 8 as shown in FIG. 3 but may be in the shape of a comb-type ring 9 as shown in FIG. 4. The comb tips 13 of the ring may be spherically rounded. It may comprise metal or metal graphite. Advantageously, several contacts and 3 counter contact paths 4 are arranged concentrically to each other, FIG. 1 whereby the security and reliability of the continuous electrical contact connector is corresponding enhanced.

To simplify the assembly, the bottom trough 7 and the cover 11 are guided within each other by annular lands or guides 15 of the annular housing which are located within the annular groove 14 of the cover and have a certain clearance. The cover 11 is clamped together with the bottom trough 7 by several clip noses 16 located on the edge of the cover and which overlap the bottom trough 7. The assembly is dimensioned so that the cover 11 and the bottom trough 7 are compressed slightly during the mounting of the steering wheel hub 1. The hub 1 is screwed onto the steering spindle 2 against the force of the springs 12 loading the contact ring 8, while releasing the clip noses 16. To improve the guidance, the annular groove 14 and the annular lands or guide 15 may have a mutually corresponding conical shape.

I claim:

1. A continuous contact electrical connector for installation in a vehicular steering wheel assembly comprising:

an annular housing exhibiting a fixed contact path disposed in an annular bottom trough of said housing;

a cover mounted to rotate with a steering wheel exhibiting a ring contact disposed in an annular groove aligned with said contact path;

a plurality of springs located between said ring contact and said cover, in said annular groove, biasing said ring contact downward against said contact path.

2. A connector according to claim 1, wherein said contact ring is a comb-type ring exhibiting spherically rounded comb tips disposed against said contact path.

3. A connector according to claim 2, further comprising a plurality of spring biased contact rings arranged in annular grooves and aligned with corresponding contact paths arranged concentrically in the annular housing.

4. A connector according to claim 2, wherein the contact ring is metal graphite.

5. A connector according to claim 4, further comprising a plurality of spring biased contact rings arranged in annular grooves and aligned with corresponding contact paths arranged concentrically in the annular housing.

6. A connector according to claim 1, further comprising a plurality of spring biased contact rings arranged in annular grooves and aligned with corresponding contact paths concentrically arranged in the annular housing.

7. A connector according to claim 1 further comprising:

an annular guide groove in said cover;

annular lands disposed on said annular housing and aligned with said annular guide groove;

a plurality of nose clips disposed on said cover arranged to overlap said annular housing;

wherein said annular housing, said contacts and said cover are dimensioned so that said cover and said housing are compressed, during mounting of a steering wheel hub, against said springs thereby releasing said nose clips.

8. A connector according to claim 7, wherein said annular guide groove and said annular lands exhibit mutually corresponding tapered shapes.

9. A connector according to claim 7 wherein said contact ring is a comb-type ring exhibiting spherically rounded comb tips disposed against said contact path.

10. A connector according to claim 9, wherein said annular guide groove and said annular lands exhibit mutually corresponding tapered shapes.

11. A connector according to claim 9 wherein the contact ring is metal graphite.

12. A connector according to claim 11, wherein said annular guide groove and said annular lands exhibit mutually corresponding tapered shapes.

13. A connector according to claim 7 further comprising a plurality of spring biased contact rings arranged in annular grooves and aligned with corresponding contact paths concentrically arranged in said annular housing.

14. A connector according to claim 13, wherein said annular guide groove and said annular lands exhibit mutually corresponding tapered shapes.

* * * * *